G. S. NUTTER.
Improvement in Devices for Converting Reciprocating into Rotary Motion.
No. 129,582. Patented July 16, 1872.
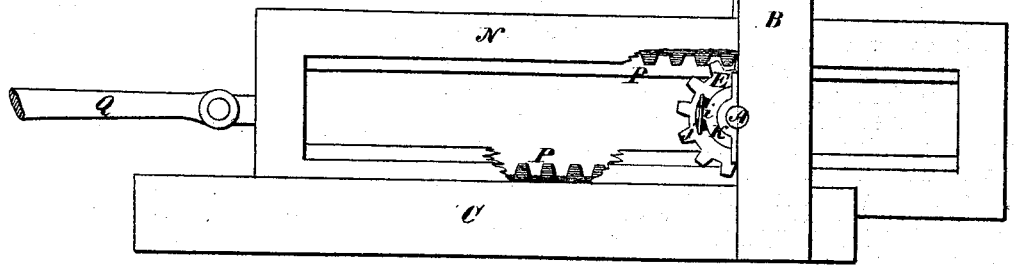
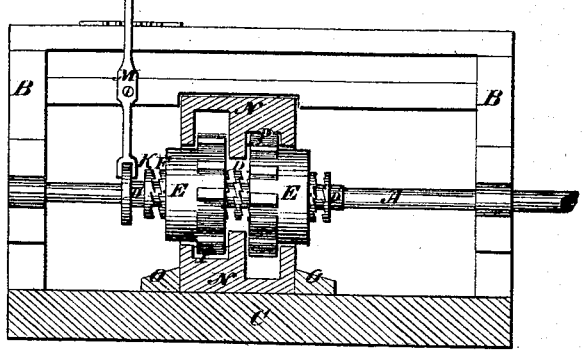
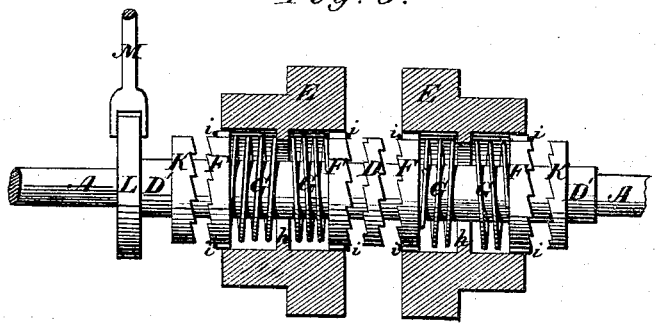

129,582

UNITED STATES PATENT OFFICE.

GRAFTON S. NUTTER, OF BUNKER HILL, ILLINOIS, ASSIGNOR OF TWO-THIRDS OF HIS RIGHT TO HARRISON NUTTER AND CHARLES H. NUTTER, OF SAME PLACE.

IMPROVEMENT IN DEVICES FOR CONVERTING RECIPROCATING INTO ROTARY MOTION.

Specification forming part of Letters Patent No. 129,582, dated July 16, 1872.

*To all whom it may concern:*

Be it known that I, GRAFTON S. NUTTER, of Bunker Hill, in the county of Macoupin and State of Illinois, have invented a new and useful Improvement in Converting Reciprocating into Rotary Motion; and I do hereby declare the following to be a full, clear, and exact description of the same, reference being had to the accompaning drawing forming part of this specification, in which—

Figure 1 is a side elevation of my improved arrangement of devices for converting reciprocating into rotary motion. Fig. 2 is a transverse section of the same taken in the line $xx$, Fig. 1; and Fig. 3 is an elevation of the shaft and gearing, partly in section.

Similar letters of reference in the accompanying drawing indicate the same parts.

My invention has for its object to provide improved means for converting reciprocating into rotary motion, to be used upon steam-engines and other machinery in place of cranks, in order to overcome the dead-points incident to the use of the latter. To this end the invention consists in the construction and combination of various devices applied to a driving-shaft, as I will now proceed to describe, whereby the latter is driven in one direction, or its motion reversed, or the devices themselves operated without turning the shaft for driving a pump or other mechanism having no connection with the main shaft.

In the accompanying drawing, A is the main or driving shaft of any combination of machinery; but for the purpose of description I will here refer to it and its attachments as applied to a portable steam-engine. The shaft A has its bearings in uprights B, supported upon a base-plate or platform, C, connected to or forming a part of the engine-frame. D′ is a long sleeve connected by a spline to the shaft A, so as to slide freely thereon longitudinally, and at the same time rotate with it. D is a double ratchet-wheel secured to the center of the sleeve, and having its teeth arranged in opposite directions. E E are short tubular cylinders mounted upon the sleeve D′, their inner ends forming pinions, as shown. F are ratchet-faced collars or wheels inserted in the ends of the pinions E, two to each pinion, with their ratchet-faces arranged in opposite directions. Their proximate faces in each pinion bear against spiral or other springs G placed within the pinions around the sleeve D′, and prevented from contact at their inner ends by a collar or flange, $h$, formed centrally around the inner circumference of the pinion. The ratchets F turn with the pinions upon the sleeve D′, being held to the former by short hooks or catches $i$ fitting over staples or loops $j$ in the face of the pinions, as shown in Fig. 1. This attachment not only causes the ratchets F to turn with the pinions, but admits of their movement to compress the springs G. K K are additional ratchet-faced wheels affixed to the opposite ends of the sleeve D′, and adapted to engage with the outer ratchet-wheels F of the pinions. One of the wheels K is provided with a collar, L, by which it is connected to a shipping-lever, M, pivoted to a cross-bar upon the uprights B. N is a rectangular frame arranged to slide between longitudinal ways O upon the base-plate C, and provided with top and bottom rack P, to engage with the pinions E upon opposite sides of the driving-shaft, as shown in Fig. 2. A pitman, Q, is connected to the double rack, by which the latter is driven from the cylinder or other suitable part of the engine.

The operation is as follows: In order to rotate the driving-shaft ahead, the shipping-lever is operated to move the sleeve D′ to the right, so that the left-hand ratchet K shall engage with its corresponding ratchet F in the left-hand pinion, and the ratchet D with its corresponding ratchet F in the right-hand pinion. The double rack is now set in motion, and at each stroke rotates the pinions in opposite directions, one turning the shaft and the other slipping loosely upon the sleeve, the springs G yielding for the ratchet-teeth to pass each other when either pinion slips upon the sleeve. To reverse the motion of the driving-shaft the sleeve D′ is moved to the left to engage the opposite set of ratchet-wheels, as will be readily understood.

When it is desired to operate the pinions without moving the shaft, for the purpose of pumping water to the engine or for any other object, the sleeve is adjusted and held by the shipping-lever, so that none of the ratchet-wheels shall engage with each other, as shown in Fig. 3. In this position the pinions rotate freely upon the sleeve, while the latter and the shaft A remain stationary.

Having thus described my invention, what I claim is—

1. In a machine for converting reciprocating into rotary motion, I claim the means, substantially as described, for reversing the motion of the driving-shaft and for operating the driving-pinions without moving the shaft, substantially as described.

2. The combination of the sliding sleeve D' and its ratchets D K with the tubular pinions E and spring-ratchets F, substantially as described, for the purposes specified.

3. The hollow pinions E constructed with the internal flange $h$, substantially as described, for the purposes specified.

4. In combination with the hollow pinions E, I claim the ratchet-wheels F and springs G, substantially as described, for the purpose specified.

5. In combination with the driving-shaft A and double reciprocating rack P, I claim the hollow pinions E with their spring-ratchets, and the sliding sleeve D' with its fixed ratchets, substantially as described, for the purposes specified.

GRAFTON S. NUTTER.

Witnesses:
NATHAN K. ELLSWORTH,
MELVILLE CHURCH.